(12) United States Patent  
Wharton

(10) Patent No.: US 9,063,390 B2  
(45) Date of Patent: Jun. 23, 2015

(54) AERIAL MOVEMENT SYSTEM WITH REACTIVE LINE

(75) Inventor: Stephen Wharton, Claremore, OK (US)

(73) Assignee: CABLECAM, LLC, Fort Worth, TX (US)

( * ) Notice: Subject to any disclaimer, the term of this patent is extended or adjusted under 35 U.S.C. 154(b) by 128 days.

(21) Appl. No.: 12/974,592

(22) Filed: Dec. 21, 2010

(65) Prior Publication Data

US 2011/0204196 A1    Aug. 25, 2011

Related U.S. Application Data

(60) Provisional application No. 61/289,820, filed on Dec. 23, 2009.

(51) Int. Cl.
| | |
|---|---|
| A47H 1/10 | (2006.01) |
| G03B 15/00 | (2006.01) |
| H04N 5/225 | (2006.01) |
| B66C 21/00 | (2006.01) |
| G03B 17/56 | (2006.01) |

(52) U.S. Cl.
CPC .............. G03B 15/00 (2013.01); H04N 5/2251 (2013.01); B66C 21/00 (2013.01); G03B 17/561 (2013.01)

(58) Field of Classification Search
USPC .......... 248/323, 328, 329, 693, 579; 348/144, 348/61, 143, 146, 147, 169, 376, 157, 373, 348/207.11
See application file for complete search history.

(56) References Cited

U.S. PATENT DOCUMENTS

| | | | | |
|---|---|---|---|---|
| 4,710,819 | A | * | 12/1987 | Brown .......................... 348/144 |
| 5,224,426 | A | * | 7/1993 | Rodnunsky et al. .......... 104/112 |
| 5,568,189 | A | * | 10/1996 | Kneller .......................... 348/144 |
| 6,873,355 | B1 | * | 3/2005 | Thompson et al. ........... 348/144 |
| 8,199,197 | B2 | * | 6/2012 | Bennett et al. ................ 348/144 |
| 2005/0242052 | A1 | * | 11/2005 | O'Connor et al. ............ 212/344 |
| 2007/0056463 | A1 | | 3/2007 | Rodnunsky |
| 2009/0103909 | A1 | * | 4/2009 | Giegerich et al. ............... 396/12 |
| 2009/0207250 | A1 | | 8/2009 | Bennett et al. |
| 2009/0301814 | A1 | | 12/2009 | Rodnunsky |

OTHER PUBLICATIONS

International Search Report, International Application No. PCT/US10/61538, dated Feb. 15, 2011.

* cited by examiner

*Primary Examiner* — Monica Millner
(74) *Attorney, Agent, or Firm* — Factor Intellectual Property Law Group, Ltd.

(57) ABSTRACT

An aerial movement system for supporting an object that includes main reels with associated motors and support lines and an auxiliary reel with an associated motor and auxiliary line wherein upon failure of the main reels, the auxiliary reel switches from a first mode of operation to a second mode of operation. The auxiliary line may also be capable of transmitting data from the object to a computer.

15 Claims, 6 Drawing Sheets

AERIAL MOVEMENT SYSTEM WITH REACTIVE LINE

RELATED APPLICATIONS

This application claims priority to U.S. Provisional Application No. 61/289,820 filed on Dec. 23, 2009, the entirety of which is hereby incorporated by reference.

TECHNICAL FIELD

The present invention relates, in general, to an aerial movement system with a safety line, and in particular, an aerial movement system for a camera.

BACKGROUND

Aerial movement systems are useful in moving, for example, a camera over a large expanse such as a football field, or basketball court. While the remaining description generally discusses these aerial movement systems as they relate to cameras, it should be appreciated and understood that the present invention is not necessarily limited only to aerial movement systems with a camera.

Since the aerial movement systems suspend heavy camera equipment, often times over spectators and/or competitors, it is desirable to have one or more safety systems in place to avoid a system failure resulting in the suspended equipment falling downward and potentially injuring people. In addition, it is desirable to protect the expensive camera equipment from damage that could occur as a result of a fall. This need to protect spectators and/or competitors and the need to avoid unnecessarily damaging the camera systems has spurred the growth of safety systems for use with aerial movement systems.

Some safety systems for aerial movement devices utilize passive systems, such as those that include a block and tackle or similar type arrangement. By only utilizing weights and relying on gravity to activate the safety mechanism, these systems are passive and do not actively determine if a failure occurred. In addition, these types of systems are placed along the existing support lines that are used to move the camera. While these systems are presumably effective for their intended purposes, by utilizing the existing lines, these systems may not be configured to appropriately respond to all types of system failures. In addition, by not actively determining if a failure occurred, these systems may not respond to all failures, or may incorrectly respond to a non-failure.

Other safety systems for aerial movement devices utilize systems that provide an additional line. For example, U.S. Pat. Pub. No. 2009/0207250, discloses the use of a safety system which utilizes an additional line associated with a reel. The reel functions in a constant tension operation mode. While these systems are presumably effective for their intended purposes, there is no control over the movement of the object being suspended, as the reel of the safety line maintains a constant tension. This lack of control could present further safety concerns. In addition, by not determining if a failure has occurred, the system may not respond correctly to all failures, and, the system may incorrectly respond to a non-failure.

It would be desirable for an aerial movement system to include a reactive safety system that can determine if a failure occurs and react accordingly.

It would also be desirable if the system could be utilized not only as a safety system, but also as an integral part of the aerial movement system by allowing for the transmission of data from the object through the use of a line in the safety system.

It would be desirable to have a system that minimizes unnecessary wear and pull on the other components of the aerial movement system.

BRIEF SUMMARY OF THE INVENTION

In an embodiment of the invention, the invention provides an aerial movement system that includes an object and a plurality of main reels. Each main reel includes a motor and a support line coupled to the object. Each motor of the main reels communicates with a computer for controlling movement of the motors of the main reels.

The aerial movement system also includes an auxiliary reel that further includes a motor and an auxiliary line coupled to the object. The motor of the auxiliary reel also communicates with a computer. Unlike the main motors, in a normal (i.e., non-failure situation) the auxiliary reel does not act to move the object.

Upon a failure of one or more of the main reels, the motor of the auxiliary reel may switch operation modes from a first operation mode to a second operation mode. In an embodiment of the invention, the first operation mode may be a tension mode and the second operation mode may be a velocity mode.

Thus, when, for example, the computer determines that there is a failure associated with one or more of the main reels, the auxiliary reel switches operation modes, in an embodiment, from a tension mode to a velocity mode. The object will then be safely moved at a constant velocity, for example, to a predetermined point or for a predetermined amount of time.

By controlling the velocity, the object will be moved away safely at a controlled rate. This minimizes the chances that the object may create further dangerous situations and/or safety concerns because of the uncontrolled speed at which the object is moving.

In another embodiment, the auxiliary reel may be in a step and direct operation mode and may be slaved to one of the main reels. In other words, the line associated with the auxiliary reel minors the actions of a line associated with one of the main reels.

An aerial movement system which is reactive and which utilizes a separate line than the existing support lines may provide increased safety for the system.

These and other benefits of the present invention will be readily apparent to one of ordinary skill in the art with this disclosure and the attached drawings before them.

BRIEF DESCRIPTION OF THE DRAWINGS

The present invention will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

DETAILED DESCRIPTION

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
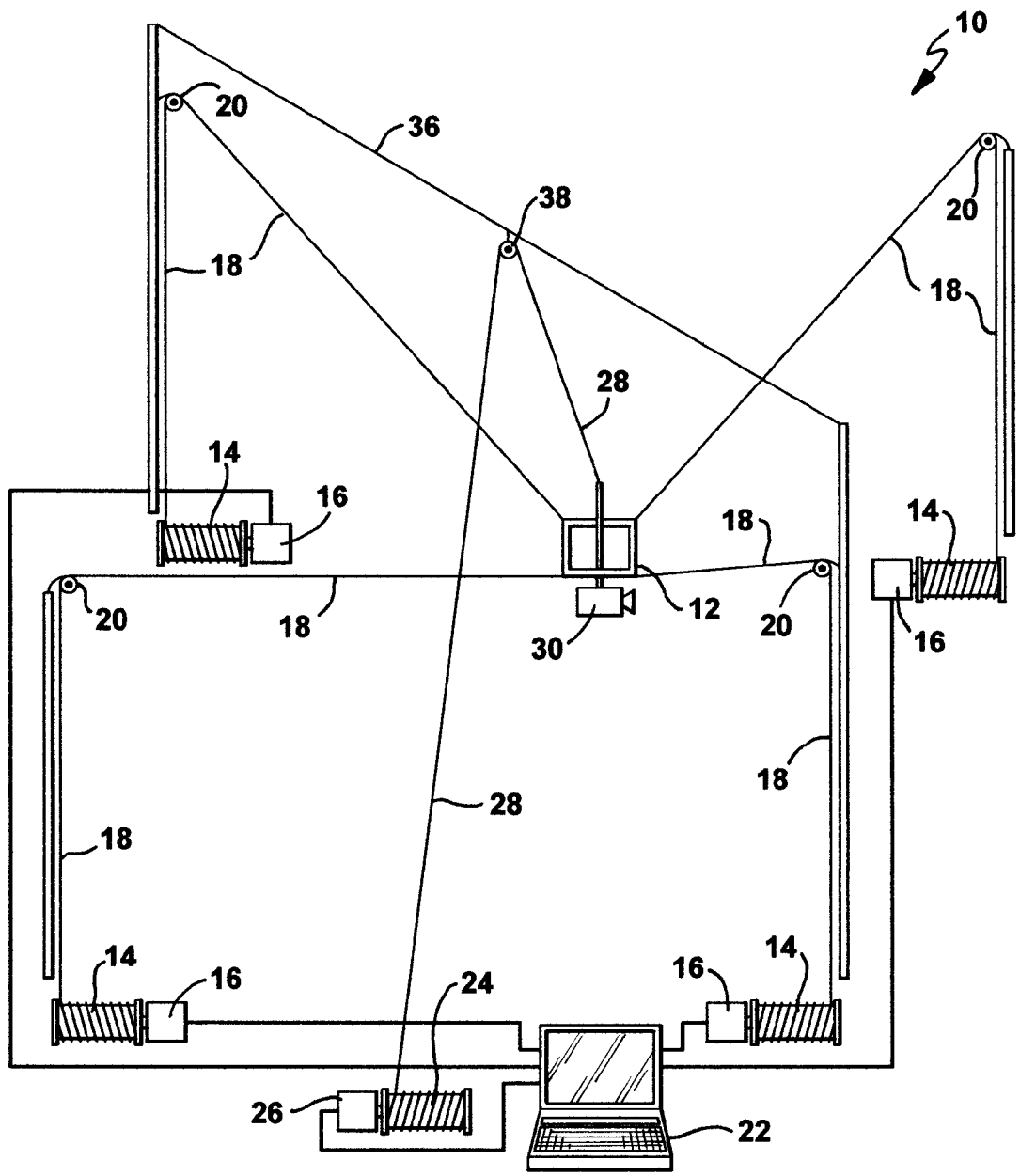
FIG. 1 is a schematic illustration of an embodiment of an aerial movement system according to the present invention.

Referring to FIG. 1, the present invention relates to an aerial movement system 10 for moving an object 12. The aerial movement system 10 includes a plurality of main reels 14. Each main reel 14 is coupled to a motor 16. The motor 16 can be a separate structure from the main reel 14, or alternatively, the main reel 14 and motor 16 can be a unitary structure.

Figure 2:
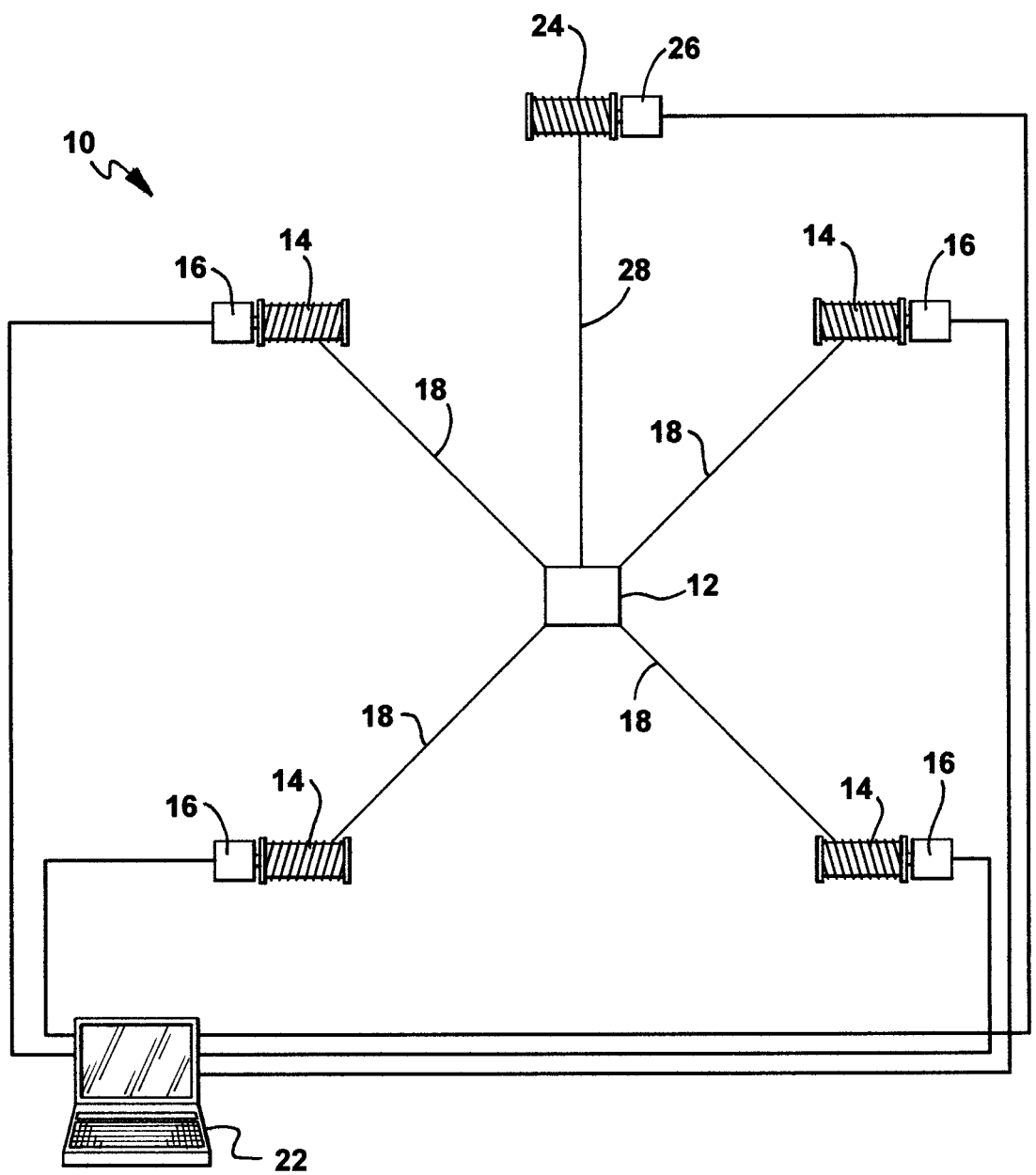
FIG. 2 is a schematic illustration of another embodiment of an aerial movement system according to the present invention.

Each main reel 14 also includes a support line 18. The support lines 18 are coupled to the object 12. As shown in FIG. 1 the support lines 18 can be redirected through sheaves 20 towards the object 12. Alternatively, as shown in FIG. 2, the support lines 18 can be directly coupled to the object 12—that is, there is no structure directing the support lines 18 to the object 12 and the main reel 14.

The motors 16 communicate with a computer 22. As used herein, motors 16 refer generally to the mechanics that turn the reels 14, and, as appreciated by one of skill in the art, said mechanics may include a motor controller that comprises an embedded computer running code and a motor servo which communicates to the computer 22 and then converts the data signals into a directional and speed movement.

The computer 22 controls the motors 16 and thus, the movement of the object 12 through the support lines 18. It will be readily appreciated by those of skill in the art that the motors 16 are in communication with the computer 22 through a variety of well known means, including wireless communication, fiber optic, ethernet, copper, and other means well know to those of skill in the art.

In an embodiment of the present invention, the aerial movement system 10 also includes an auxiliary reel 24. Like the main reel 14, the auxiliary reel 24 includes a motor 26 and an auxiliary line 28. The auxiliary line 28 is coupled to the object 12.

Figure 3:
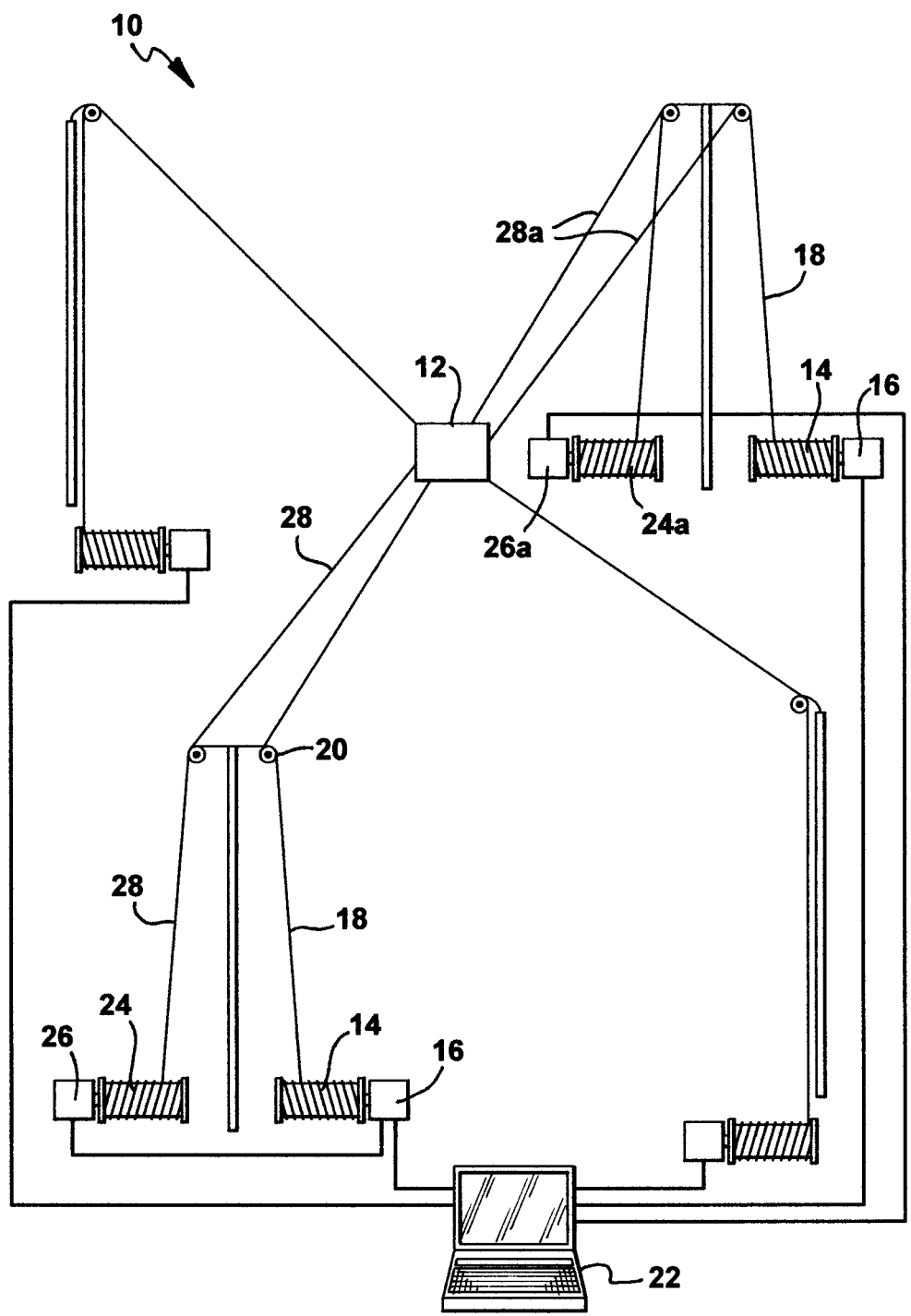
FIG. 3 is a schematic illustration of another embodiment of an aerial movement system according to the present invention.
Figure 5:
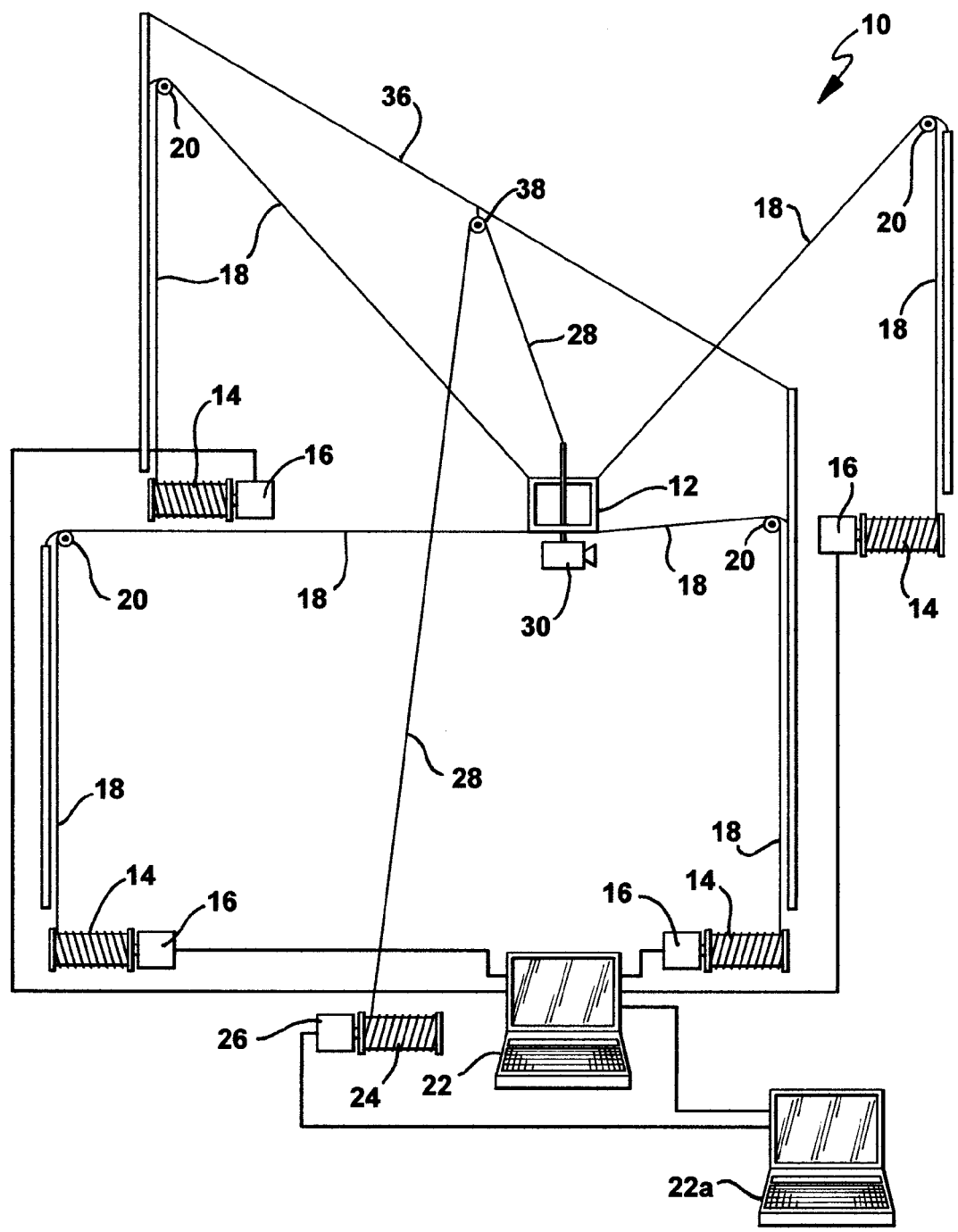
FIG. 5 is a schematic illustration of an embodiment of an aerial movement system according to the present invention.

The motor 26 of the auxiliary reel 24 may be in communication with the computer 22. In one embodiment the motor 26 of the auxiliary reel 24 is in indirect communication with the computer 22—for example, the motor 26 is in communication with the computer 22 through one of the motors 16 (see, e.g., FIG. 3). However, it is also contemplated that the motor 26 of the auxiliary reel 24 is in direct communication with the computer 22. Moreover, the motor 26 of the auxiliary reel 24 may be in communication with a second computer 22a—i.e., a computer 22a that is different than computer 22 (see, e.g., FIG. 5).

The motor 26 of the auxiliary reel 24 is normally in a first operation mode. In a preferred embodiment, the first operation mode comprises a tension mode. As should be understood to those of skill in the art, the tension mode operates by keeping a constant tension throughout the auxiliary line 28.

In the event of a failure of one or more of the main reels 14, the auxiliary reel 24 switches operation modes from the first operation mode to a second operation mode. In an embodiment, the first operation mode is a tension mode and the second operation mode is a velocity mode. The switching of modes will facilitate the object 12 being moved at a safe and constant velocity, as opposed to the devices where the auxiliary reel 24 stays in tension mode and maintains the same tension.

As used herein, failure of one of more of the main reels 14 means failure of the main reels 14, the motors 16 associated with the main reels 14, the support lines 18, or other similar failures that might be associated with the main reel 14. For example, a support line 18 breaking would be considered a failure of the main reels 14. In addition, an electrical malfunction that resulted in a loss of tension on one of the support lines 18 would also be considered a failure of the main reels 14.

In one embodiment of the invention, there are four main reels 14. In other embodiments of the invention, more or less main reels 14 may be used.

In another embodiment of the invention, the auxiliary line 28 is capable of transmitting data from the object 12 to, for example, the computer 22. In other words, if the object 12 is a camera 30, the auxiliary line 28 may transmit the data and video signal from the camera 30 to the computer 22. Similarly, if the object 12 is a probe (not shown), the auxiliary line 28 may transmit the data from the probe back to the computer 22. It should be understood that the computer 22 that receives the data from the object 12 through the auxiliary line 28, could also be computer 22a, or a third computer.

In such an embodiment where the auxiliary line 28 transmits data from the object 12, the support lines 18 may be comprised of cable. As used herein, cable is meant to mean any material that is sufficient to safely support the object 12 and that does not transmit data. Such cable may be made of metal, plastic, alloys, or other materials. In such an embodiment, there is no longer a need to make all of the support lines 18 transmit data from the object 12; and thus, it is less expensive since the support lines 18 can be made of less expensive material.

The aerial movement system 10 may also include a second auxiliary reel 24a, with an associated motor 26a and auxiliary line 28a.

As previously discussed, in some uses of the aerial movement system 10, the object 12 is a camera 30. In such a use, coupling the camera 30 to the support lines 18 and auxiliary line 28 is typically done with a gimble 32. In an embodiment of the present invention, the gimble 32 includes an extension 34. The extension 34 allows the auxiliary line 28 to support the camera 30, without negatively affecting the movement of the camera 30 and without causing additional strain on the motors 16 of the main reels 18 or on the motors in the camera 30 that operate to keep the camera 30 in a stable position.

Figure 4:
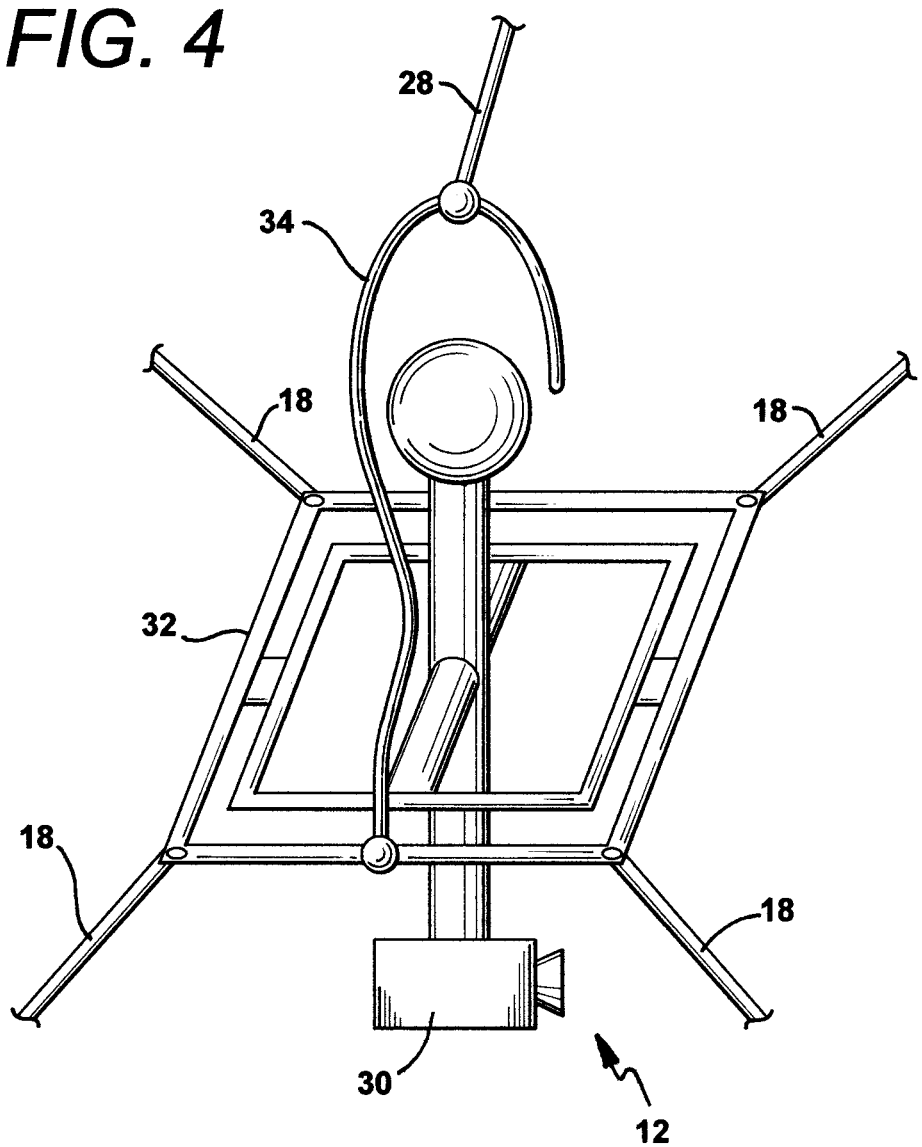
FIG. 4 is a perspective view of an object suspended in an aerial movement system according to the present invention.

In some embodiments, the support lines 18 may be coupled to the camera 30 to form a plane—for example, through the use of a gimble 32 (see, FIG. 4). It should be understood that by plane it is meant that the support lines 18 substantially form a plane and that minor variances may be included and still fall within the scope of the term plane. In such an arrangement, it is contemplated that the auxiliary line 28 is coupled to the camera 30 outside of the plane. Again, this arrangement may avoid unnecessary strain on motors 16 and the camera 30.

In some embodiments of the aerial movement system 10, the system 10 is used such that it is possible to dispose the auxiliary reel 24 and motor 16 above the object 12 (see, FIG. 2). Alternatively, in some uses of the aerial movement system 10, the auxiliary reel 24 and motor 16 are disposed on the ground and it is necessary to utilize a highline 36 and sheave 38 to redirect the auxiliary line 28 to the object 12 (see, FIG. 1). In either of these two embodiments, the support lines 18 and the auxiliary line 28 are relatively perpendicular to each other.

In some instances it may not be possible to utilize a highline 36 or dispose the auxiliary reel 24 and motor 26 above the object 12. In such uses, it is contemplated that the auxiliary line 28 be parallel to the support lines 18 (see, FIG. 3). In other words, if the support lines 18 are run through sheaves 20, then the auxiliary line 28 runs a relatively parallel path from the auxiliary reel 24 to the object 12.

In either embodiment, where the auxiliary line 28 is perpendicular or parallel, these uses of these terms are not meant to encompass exactly perpendicular or parallel configurations, but rather, those configurations that are substantially parallel or perpendicular, as would be appreciated by one of ordinary skill in the art.

Figure 6:
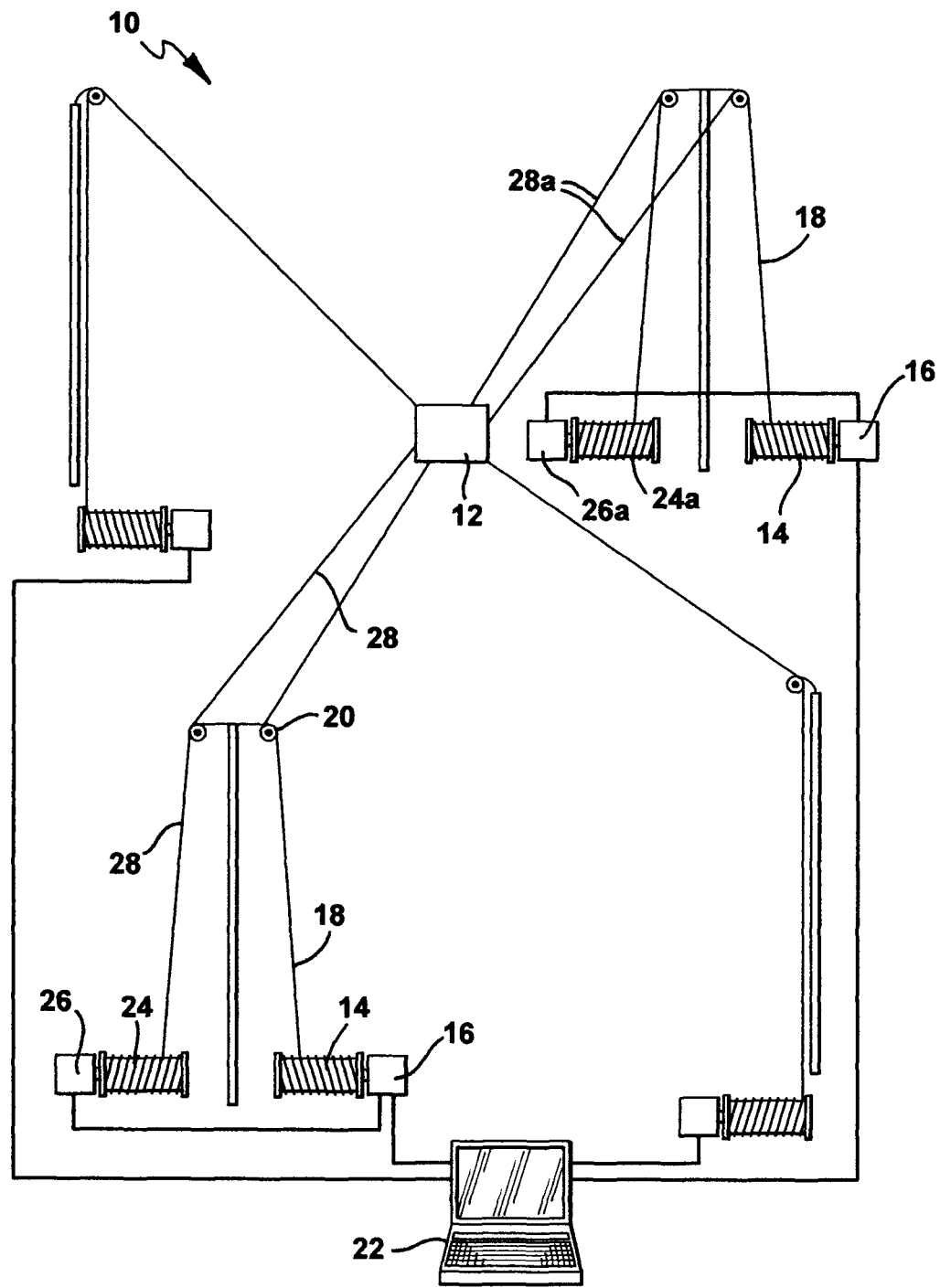
FIG. 6 is a schematic illustration of an embodiment of an aerial movement system according to the present invention.

In another embodiment of the invention, where the auxiliary line 28 is parallel to one of the support lines 18 (see, FIG. 6), it is contemplated that the motor 26 of the auxiliary reel 24 is initially in a step and direction mode and it is slaved to one of the main reels 14 such that the movement of the auxiliary line 28 minors the movement of the support line 18 of the main reel 14. Upon a failure of one of the main reels 14, the auxiliary reel 24 may switch operation modes to safely support the object 12. In such and embodiment, the initial mode of the auxiliary reel 24 does not necessarily have to be a step and direction mode, other initial modes could be used.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure provided herein. In other words, various modifications and improvements of the embodiments specifically disclosed in the description above are within the scope of the appended claims. The scope of the invention is therefore defined by the following claims.

What is claimed is:

1. An apparatus comprising:
   an object;
   a plurality of main reels, each main reel including a motor and a support line coupled to the object;
   each motor of the main reels communicating with a computer for controlling movement of the motors of the main reels;
   an auxiliary reel including a motor and an auxiliary line coupled to the object; the motor of the auxiliary reel being in a tension mode in which the motor maintains a constant tension on the auxiliary line, and, when the computer detects a failure of one or more of the main reels has occurred, the motor switches to a velocity mode in which the motor applies a constant velocity on the auxiliary line, so that the object is moved at a controlled rate.

2. The apparatus of claim 1 wherein the plurality of mail reels comprises four main reels.

3. The apparatus of claim 1 wherein the auxiliary line is capable of transmitting a data from the object to a computer.

4. The apparatus of claim 3 wherein the support lines are a cable.

5. The apparatus of claim 1 further comprising a second auxiliary reel including a motor and an auxiliary line coupled to the object.

6. The apparatus of claim 1 wherein the support lines are coupled to the object to form a plane.

7. The apparatus of claim 6 wherein the auxiliary line is coupled to the object out of the plane.

8. The apparatus of claim 1 wherein the auxiliary line runs substantially perpendicular to at least one of the support lines.

9. The apparatus of claim 1 wherein the auxiliary line runs substantially parallel to at least one of the support lines.

10. An apparatus comprising:
    an object;
    a plurality of mail reels, each mail reel including a motor and a support line coupled to the object;
    each motor of the main reels communicating with a computer for controlling movement of the motors of the main reels;
    an auxiliary reel including a motor and an auxiliary line coupled to the object, the auxiliary line capable of transmitting a data from the object to a computer;
    wherein the support lines are coupled to the object to form a plane;
    wherein the auxiliary line is coupled to the object out of the plane; and,
    wherein the motor of the auxiliary reel is in a tension mode in which the motor maintains a constant tension on the auxiliary line and, when the computer detects that one or more of the main reels has failed, the motor switches to a velocity mode in which the motor applies a constant velocity on the auxiliary line so that the object is moved at a controlled rate.

11. The apparatus of claim 10 wherein the plurality of mail reels comprises four main reels.

12. The apparatus of claim 10 wherein the support lines are a cable.

13. The apparatus of claim 10 further comprising a second auxiliary reel including a motor and an auxiliary line coupled to the object.

14. The apparatus of claim 10 wherein the auxiliary line runs substantially perpendicular to at least one of the support lines.

15. The apparatus of claim 10 wherein the auxiliary line runs substantially parallel to at least one of the support lines.

* * * * *